United States Patent [19]  [11]  4,448,896
Kageyama et al.  [45]  May 15, 1984

[54] HYDROGENATION CATALYST FOR DESULFURIZATION AND REMOVAL OF HEAVY METALS

[75] Inventors: Yoichi Kageyama, Isehara; Kazuhiko Onuma, Machida; Toshihiro Kawakami, Yokkaichi; Makoto Suzuki, Yokohama, all of Japan

[73] Assignees: Mitsubishi Chemical Ind., Ltd.; Asia Oil Company Limited, both of Tokyo, Japan

[21] Appl. No.: 384,626

[22] Filed: Jun. 3, 1982

[30] Foreign Application Priority Data

Jun. 2, 1981 [JP] Japan .................................. 56-84703
Jun. 4, 1981 [JP] Japan .................................. 56-86116

[51] Int. Cl.$^3$ ........................ B01J 21/04; B01J 23/24; B01J 23/74
[52] U.S. Cl. ................................ 502/314; 208/216 R; 208/251 H
[58] Field of Search .................... 252/465; 208/251 H

[56] References Cited

U.S. PATENT DOCUMENTS 2,911,374 11/1959 Malley et al. ........................ 252/465
3,075,915 1/1963 Arnold et al. ................... 252/465 X
4,031,137 6/1977 Schmitt et al. ................. 252/447 X

FOREIGN PATENT DOCUMENTS 2055787 3/1981 United Kingdom .

Primary Examiner—W. J. Shine
Attorney, Agent, or Firm—Oblon, Fisher, Spivak, McClelland & Maier

[57] ABSTRACT

A hydrogenation catalyst for desulfurization and removal of heavy metals, comprises (a) at least one metal component selected from metals of Groups VI B and VIII of the Periodic Table, as a catalytically active component, and (2) a porous activated alumina carrier obtained by shaping a mixture of carbon black and a powder of activated alumina or a precursor of activated alumina, drying the shaped mixture and firing it in an oxygen-containing gas stream to burn off the carbon black.

17 Claims, No Drawings

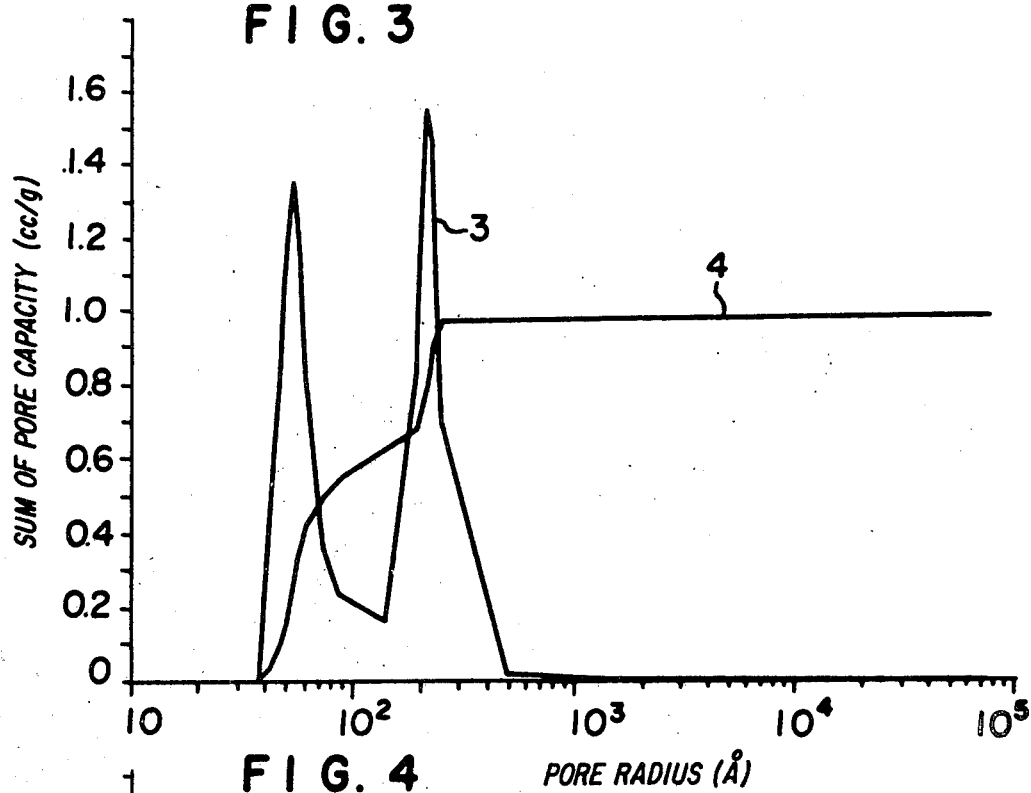
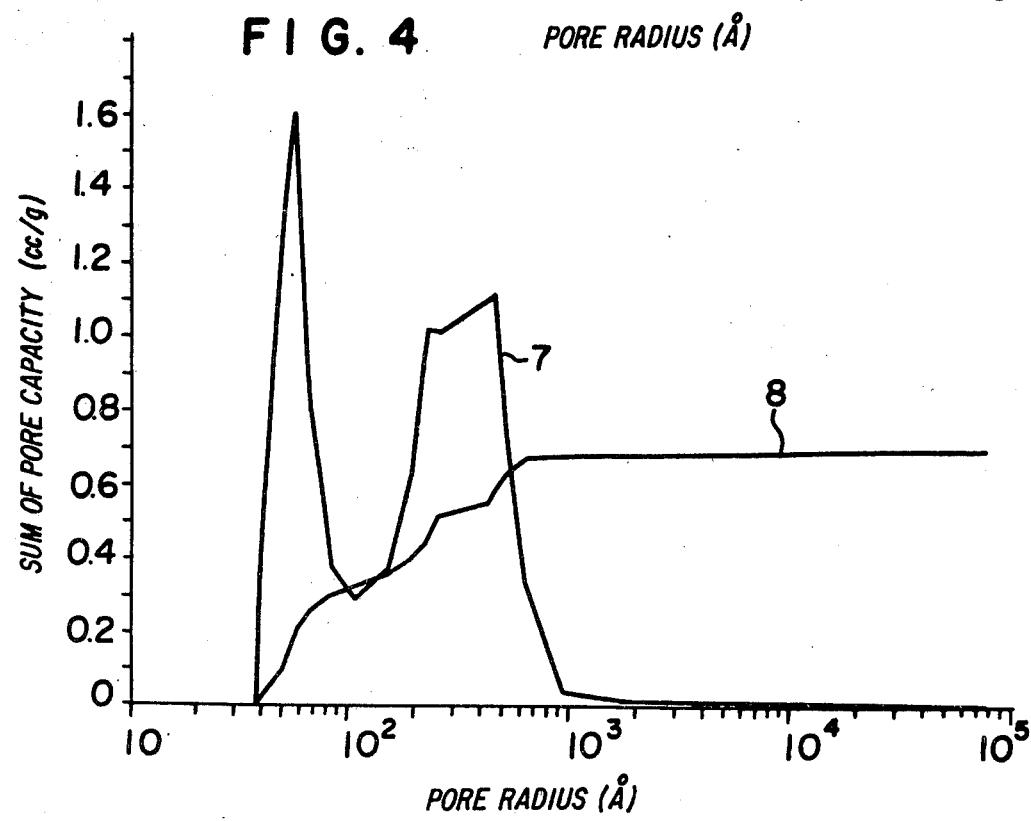

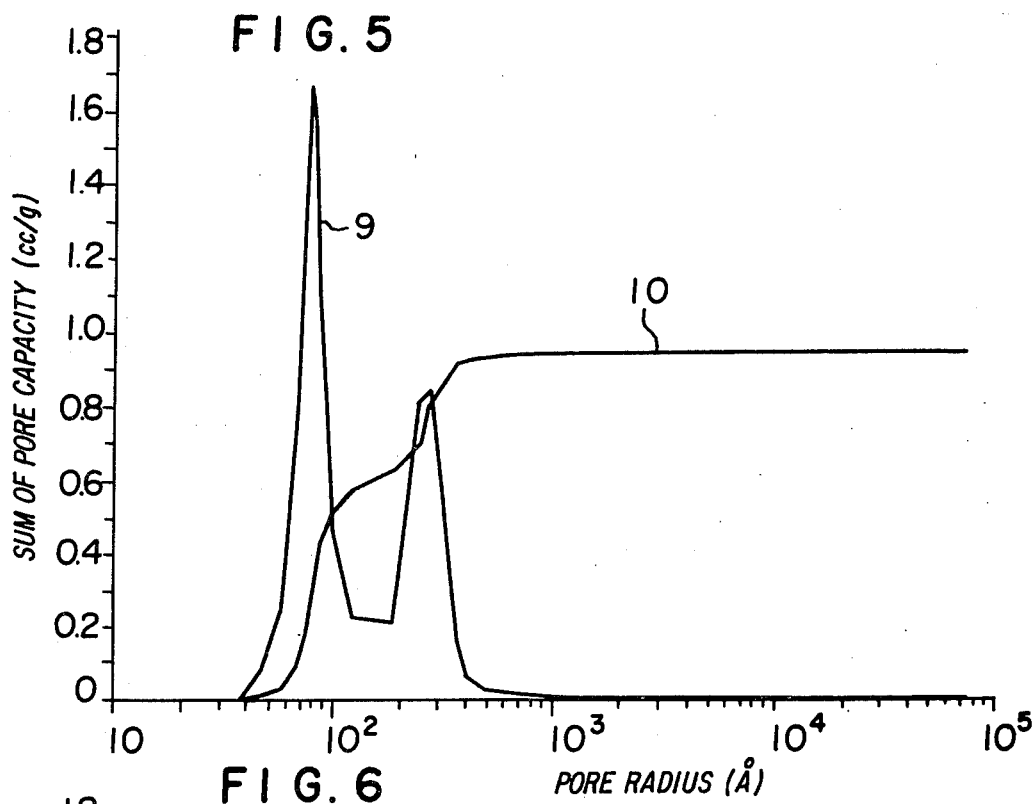
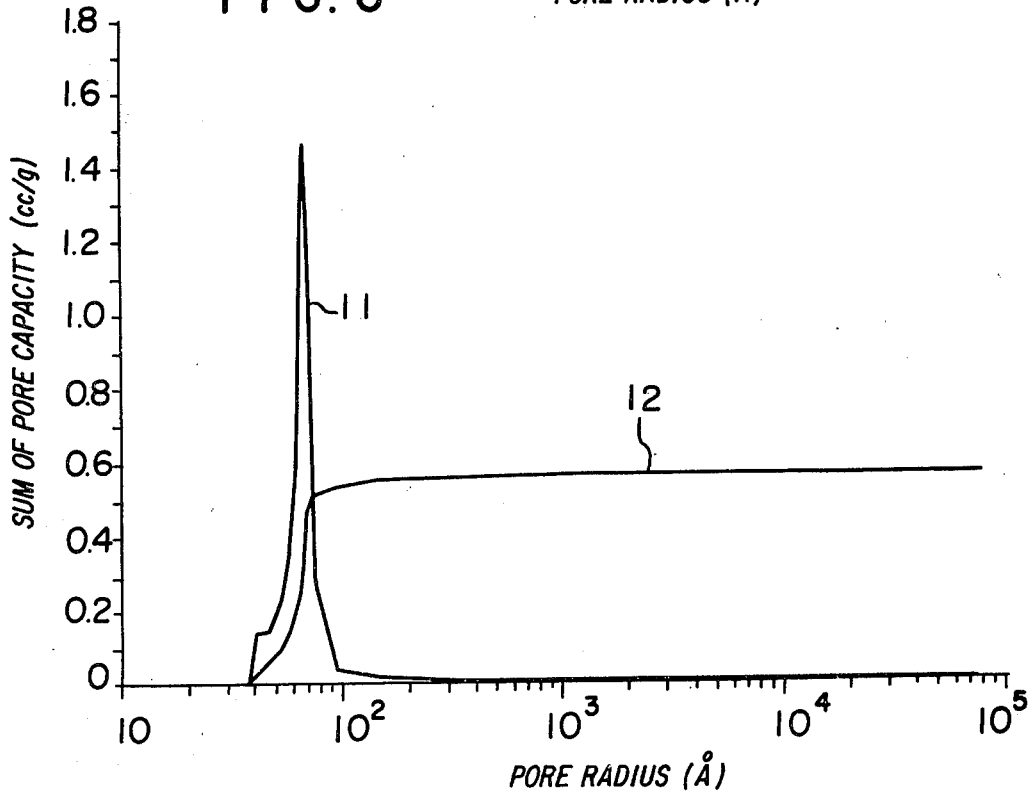

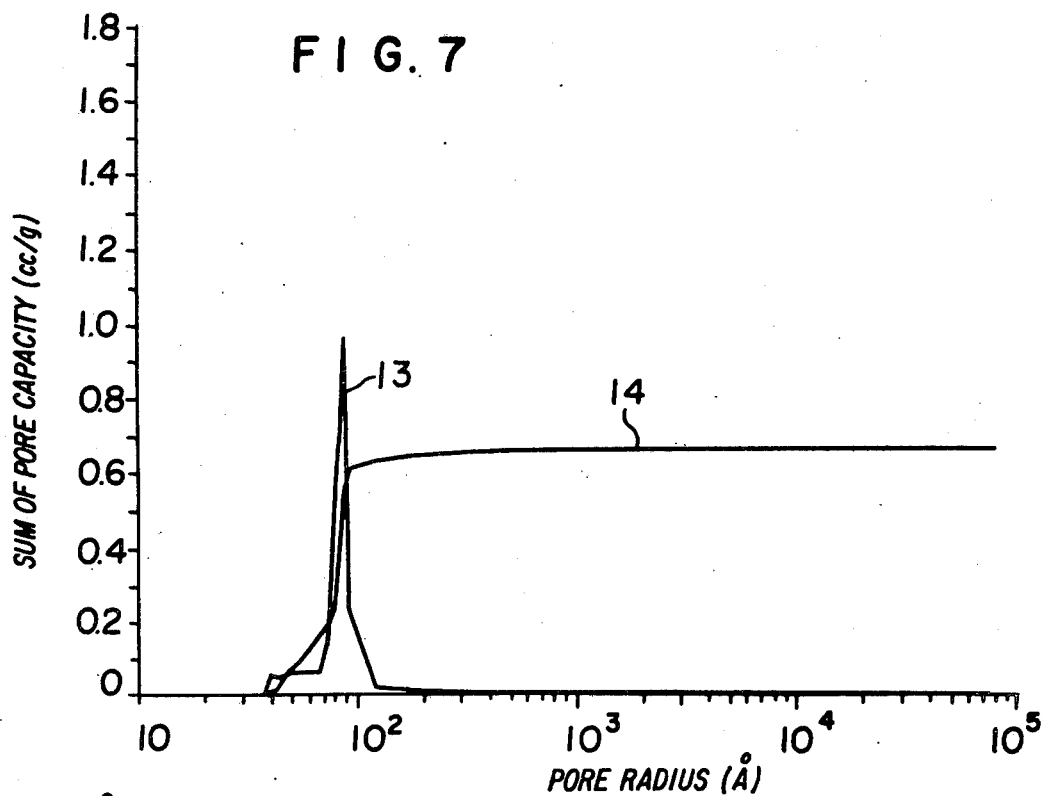
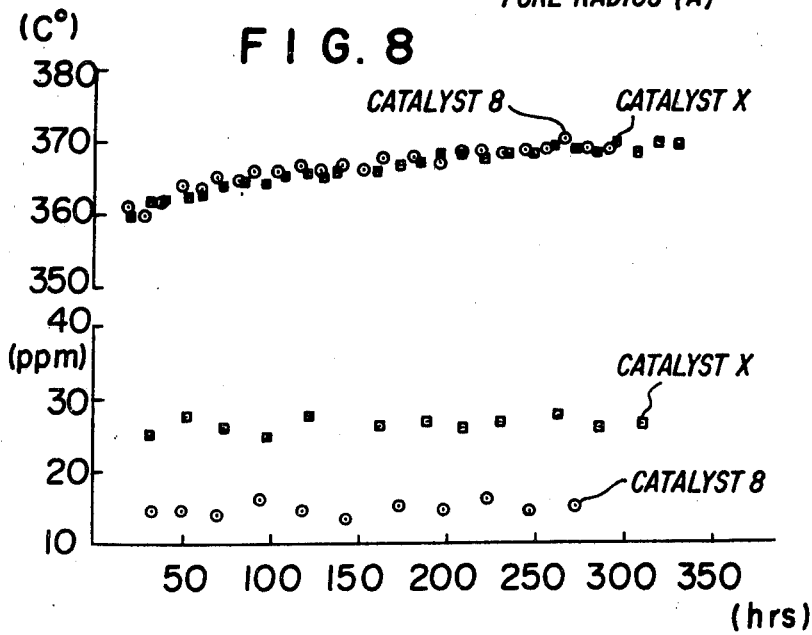

HYDROGENATION CATALYST FOR DESULFURIZATION AND REMOVAL OF HEAVY METALS

BACKGROUND OF THE INVENTION

1. Field of the Invention

The present invention relates to a catalyst comprising a porous activated alumina carrier and a catalytically active component of metals of Groups VI B and VIII of the Periodic Table carried thereon, and a process for its production. More particularly, it relates to a catalyst which exhibits a superior catalytic activity in the hydrogenation treatment of heavy oils for desulfurization and removal of heavy metals, and a process for the production of such a catalyst.

2. Description of the Prior Art

Heavy oils such as residual oils obtainable from atmospheric distillation of crude oils or light oils and residual oils obtainable from reduced pressure distillation of crude oils, contain sulfur compounds and heavy metals as impurities. When the heavy oils are to be used as fuels or to be processed to produce light oils, it is necessary to preliminarily remove these impurities.

As a catalyst for the hydrogenation desulfurization of heavy oils, a catalyst is known wherein a metal of Group VI B of the Periodic Table such as molybdenum or tungsten and a metal of Group VIII of the Periodic Table such as cobalt or nickel are supported on a carrier such as alumina. Such a catalyst tends to readily lose its catalytic activity when brought in contact with asphaltenes or heavy metals contained in the heavy oils. Under the circumstances, various studies have been made to improve the catalyst, particularly to improve the physical properties of the alumina carrier.

SUMMARY OF THE INVENTION

The present inventors have conducted extensive researches to develop a highly effective catalyst for the hydrogenation desulfurization of heavy oils, and as a result, have found that a catalyst prepared by shaping a mixture of carbon black and a powder of activated alumina or a precursor of activated alumina, which may or may not contain a catalytically active component selected from metals of Groups VI B and VIII of the Periodic Table, drying the shaped mixture and firing it in an oxygen-containing gas stream to burn off the carbon black, and, when the above mixture does not contain the catalytically active component, applying the catalytically active component onto the porous activated alumina carrier thereby obtained, has a superior catalytic activity and is capable of maintaining the catalytic activity for a long period of time as a catalyst for the hydrogenation of heavy oils for desulfurization and removal of heavy metals. Thus, the present invention has been accomplished.

An object of the present invention is to provide a catalyst which has a superior catalytic activity and which is capable of maintaining the catalytic activity for a long period of time, as a catalyst for the hydrogenation of heavy oils for desulfurization and removal of heavy metals.

Another object of the present invention is to provide a process for producing such a highly effective hydrogenation catalyst for desulfurization and removal of heavy metals.

The present invention provides a hydrogenation catalyst for desulfurization and removal of heavy metals, which comprises (a) at least one metal component selected from metals of Groups VI B and VIII of the Periodic Table, as a catalytically active component, and (2) a porous activated alumina carrier obtained by shaping a mixture of carbon black and a powder of activated alumina or a precursor of activated alumina, drying the shaped mixture and firing it in an oxygen-containing gas stream to burn off the carbon black.

The present invention also provides a process for producing such a catalyst, which comprises shaping a mixture of carbon black and a powder of activated alumina or a precursor of activated alumina, said mixture containing or not containing a catalytically active component selected from metals of Groups VI B and VIII of the Periodic Table; drying the shaped mixture; and firing it in an oxygen-containing gas stream to burn off the carbon black; and, when said mixture does not contain the catalytically active component, applying the catalytically active component onto the porous activated alumina carrier thereby obtained.

BRIEF DESCRIPTION OF THE DRAWINSGS

FIGS. 1 to 7 respectively are graphs illustrating the pore distributions of Catalysts 2, 4, 6, 7 and 8 of the Examples and of Catalysts U and X of the Comparative Examples. In each of FIGS. 1 to 7, the horizontal axis represents the radius (Å) of pores, and the vertical axis represents a sum of pore capacity (cc/g) of pores. Curves 1, 3, 5, 7, 9, 11 and 13 represent the pore distribution curves and curves 2, 4, 6, 8, 10, 12 and 14 represent the pore capacity curves.

FIG. 8 is a graph showing the results obtained by the hydrogenation treatment of heavy oils for desulfurization and removal of heavy metals conducted in Application Example 2.

DETAILED DESCRIPTION OF THE PREFERRED EMBODIMENTS

Figure 1:
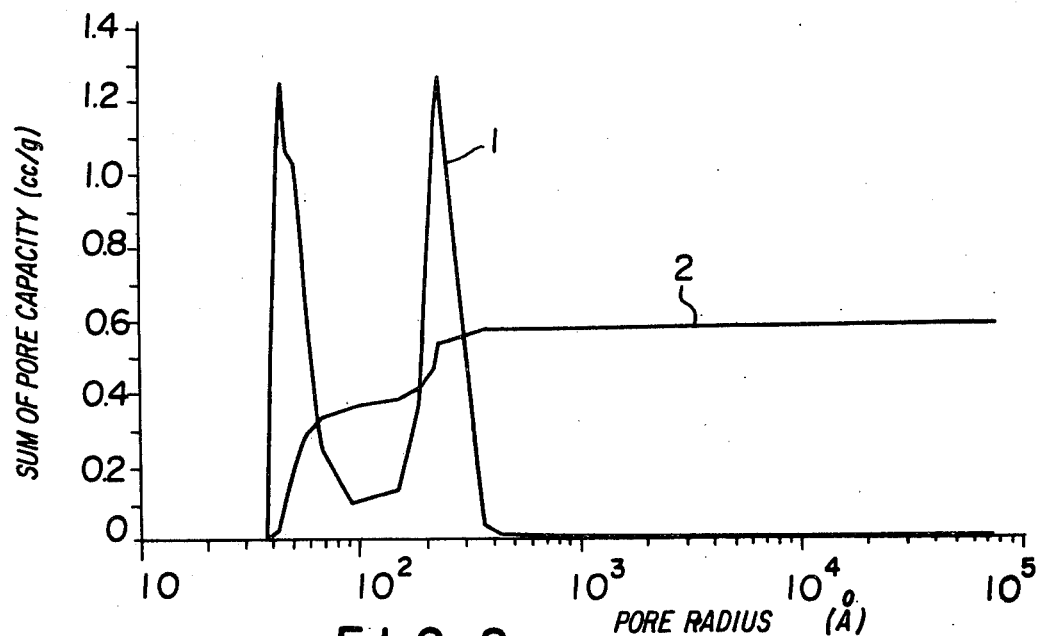

The catalyst of the present invention usually has a specific surface area of from 100 to 350 m$^2$/g, preferably from 200 to 300 m$^2$/g. The total pore capacity of pores having a radius within a range of from 37.5 to 75,000 Å is within a range of from 0.5 to 1.5 cc/g, preferably from 0.7 to 1.2 cc/g. The major proportion of the total pore capacity, preferably at least 90% of the total pore capacity, is constituted by pores having a radius within a range of from 37.5 to 1000 Å. The pore distribution is such that there is a distinct peak in each of a radius range of less than 100 Å and a radius range of from 100 to 1000 Å. The pore capacity of pores having a radius within a range of from 37.5 to 100 Å is at least 0.2 cc/g, preferably from 0.4 to 0.7 cc/g, and the pore capacity of pores having a radius within a range of from 100 to 1000 Å is at least 0.1 cc/g, preferably from 0.2 to 0.5 cc/g. Thus, the catalyst of the invention is highly porous with the above mentioned specific pore distributions. It has good mechanical strength and wear resistance as well as superior properties for desulfurization and removal of heavy metals, and it is far superior to the conventional catalysts in the durability of its catalytic activity.

Within the above specified pore distribution characteristics, if the characteristics having narrower ranges are selected, the properties of the catalyst for desulfurization and removal of heavy metals can be maintained at a higher level. Namely, it is preferred that the catalyst has, in addition to the above mentioned specific surface area, the following characteristics: The total pore capacity of pores having a radius within a range of from 37.5 to 75,000 Å is within a range of from 0.5 to 1.5 cc/g, preferably from 0.7 to 1.2 cc/g; at least 90% of the total pore capacity is constituted by pores having a radius within a range of from 37.5 to 500 Å; the pore distribution is such that there is a distinct peak in each of a radius range of from 50 to 100 Å and a radius range of from 100 to 500 Å; the pore capacity of pores having a radius within a range of from 37.5 to 100 Å is at least 0.4 cc/g, preferably from 0.4 to 0.8 cc/g; and the pore capacity of pores having a radius within a range of from 100 to 500 Å is at least 0.1 cc/g, preferably from 0.2 to 0.5 cc/g.

The hydrogenation catalyst for desulfurization and removal of heavy metals according to the present invention may be prepared either (1) by shaping a mixture of carbon back and a powder of activated alumina or a precursor of activated alumina, drying the shaped mixture, firing it in an oxygen-containing gas stream to burn off the carbon black and applying a catalytically active component selected from metals of Groups VI B and VIII of the Periodic Table on the porous activated alumina carrier thereby obtained, or (2) by shaping a mixture of carbon black, a powder of activated alumina or a precursor of activated alumina and as a catalytically active component, a single substance or a compound of at least one metal selected from metals of Groups VI B and VIII of the Periodic Table; drying the shaped mixture; and firing it in an oxygen-containing gas stream to burn off the carbon black.

As the activated alumina powder, there may be used a powder of $\gamma$-alumina or $\eta$-alumina, and as the powder of the precursor of activated alumina, there may be used a powder of an alumina hydrate such as boehmite, pseudoboehmite or gibbsite, or a powder of rehydratable transition alumina such as $\chi$-alumina or $\rho$-alumina.

Carbon black usually has a secondary chain structure formed by cohesion of grains (hereinafter referred to as "structure"). The degree of the structure size can be shown by an oil absorption of carbon black (such as DBP absorption: a volume of dibutyl phthalate absorbed in 100 g. of carbon black, unit ml/100 g.). In the present invention, carbon black having a particle size within a range of from 150 to 3000 Å and a DBP absorption within a range of from about 60 to 300 ml/100 g. is used. Specifically, there may be used commercially available carbon blacks including channel black such as Mitsubishi Carbon Black #100, #600 manufactured by Mitsubishi Chemical Industry, Co., Ltd., furnace black such as Diablack A, Diablack H manufactured by Mitsubishi Chemical Industry Co., Ltd., and Asahithermal FT manufactured by Asahi Carbon; Denkaacetylene manufactured by Denki Kagaku Kogyo and Ketjen black EC manufactured by Akzo Chem.

The carbon black is incorporated in an amount of from 10 to 120 wt.%, preferably from 20 to 100 wt.% based on the powder of activated alumina or a precursor thereof.

In the step of the shaping, water and various shaping additives are usually added to the mixture of carbon black and activated alumina or a precursor thereof. As preferred shaping additives, there may be mentioned inorganic acids such as nitric acid and hydrochloric acid; organic acids such as formic acid, acetic acid and propionic acid; basic nitrogen compounds such as ammonia, hydrazine, an aliphatic amine, an aromatic amine and a heterocyclic amine; and organic compounds such as polyvinyl alcohol, polyethylene glycol and crystalline cellulose.

In addition to the activated alumina, other carrier substances such as silica, magnesia, zirconia, titania, boria, chromia and zeolite, may also be added to the shaping mixture.

The mixture containing the various components as described above is mixed and kneaded as homogeneously as possible, and then shaped into an optional shape such as a spherical shape, a cylindrical shape, or a tablet shape by means of an appropriate method such as a tablet method, an extrusion method, an extrusion-granulating method, a tumbling granulating method or a briquetting method. When the catalyst is used for the hydrogenation of heavy oils for desulfurization and removal of heavy metals in a fixed bed system or a fluidized bed system, it should preferably have a spherical shape having a diameter of from 0.5 to 3 mm or a cylindrical shape having a length of from 1 to 5 mm.

The shaped mixture is optionally aged or rehydrated in a sealed container, then dried and fired or baked. In the firing step, the precursor of activated alumina is converted to activated alumina and at the same time, the carbon black is burned off. The carbon black is inflammable and added in a great amount, and if the removal of combustion heat is inadequate, it may happen that the control of the firing temperature becomes difficult and the temperature raises rapidly. Accordingly, it is necessary to take due care for firing.

The temperature for firing required to obtain the activated alumina carrier including the burning off of the carbon black is at least 500° C. With respect to the upper limit of the firing temperature, if it is upto about 800° C., a $\gamma$-alumina carrier or a $\eta$-alumina carrier is obtainable, and if it is upto about 1000° C., a $\theta$-alumina carrier is obtainable. The time for firing is not critical and is usually in a range of from 1 hour to 1 day. Thus, there is provided a porous activated alumina carrier having excellent physical properties such as good mechanical strength, wear resistance, a large surface area and a large pore capacity and having mesopores (i.e. pores having an intermediate radius within a range of from 100 to 1000 Å) formed by the addition and subsequent burning off of the carbon black, as well as micropores (pores having a relatively small radius of less than 100 Å) attributable to the primary particles of alumina. The amount of the mesopores depends on the amount of the carbon black added, and the distribution of the mesopores can be controlled by the nature of the carbon black, i.e. the size and structure of unit particles of the carbon black.

The catalytically active component having a hydrogenation activity, which is supported on the porous activated alumina carrier, is a metal of Group VI B of the Periodic Table such as molybdenum or tungsten, and a metal of Group VIII of the Periodic Table such as nickel or cobalt. These metals are supported preferably in a form of an oxide or sulfied, and in an amount of from 5 to 25 wt.% in the case of the Group VI B metal and from 0.5 to 10 wt.% in the case of the Group VIII metal, as calculated as the respective oxides in the total catalyst composition.

Further, in the present invention, it is possible to incorporate, in addition to these main active components, an assisting component such as chromium or vanadium, and/or an additional component such as titanium, boron or phosphor having an activity to convert the heavy oils into light oils, as the case requires.

The catalytically active component may be applied onto the carrier by impregnating a previously prepared porous alumina carrier with an aqueous solution of the catalytically active component, or by mixing the catalytically active component with the carbon black and a powder of activated alumina or a precursor of activated alumina, shaping the mixture thus obtained, drying it and firing it to obtain a catalyst.

In the case of the impregnation method, the carrier may be impregnated sequentially with aqueous solutions of different catalytically active ingredients one after another, or simultaneously with an aqueous solution containing all of the catalytically active ingredients. The carrier impregnated with the catalytically active component is dried and fired under the same conditions as in the above mentioned firing conditions. However, in a case of a catalytically active ingredient such as molybdenum which is susceptible to sublimation at a high temperature, the firing is preferably conducted at a temperature of not higher than about 700° C.

When applying a mixture of catalytically active ingredients, the ingredients may be used in a form of powders of their oxides or salts, and may be mixed in a dry state or in a wet state i.e. in a form of an aqueous solution containing them. In this case, the shaping, drying and firing may be conducted in the same manner as in the case of the preparation of the porous activated alumina carrier and in the case of the firing after the impregnation of the catalytically active component, as described above.

The treatment of heavy oils for desulfurization and removal of heavy metals with use of the catalyst thus prepared, may be conducted by known methods under known conditions. For instance, the hydrogenation treatment of heavy oil for desulfurization and removal of heavy metals may effectively carried out under hydrogen pressure of from 50 to 200 kg/cm²G at a temperature of from 300° to 450° C. by supplying the heavy oil to a fixed bed catalyst layer at a liquid hourly space velocity of from 0.3 to 5 hr$^{-1}$ in a ratio of hydrogen to heavy oil being from 500 to 2000 H$_2$-l/oil-l.

Now, the present invention will be described in further detail with reference to Examples.

In the Examples, the distribution and capacity of pores were measured by a mercury compression type porosimeter (Porosimeter Series 2000 manufactured by Carlo Erba Co.) with the maximum pressure of 2000 kg/cm² gauge. Accordingly, the measurable range of pores was from 37.5 Å to 75000 Å in radius.

The surface area was measured by the nitrogen adsorbing process by Sorptmatic 1800 manufactured by Carlo Erba Co. and calculated by the BET method.

The crushing strength was calculated from a crushing load (kg/piece) of specimens in the radius direction measured by Kiya type Hardness tester and shown as an average for 20 specimens.

The physical characteristics of carbon blacks used in the examples are shown in Table 1.

TABLE 1

| Carbon black | | Physical characteristic | |
|---|---|---|---|
| Kind | Particle diameter (Å) | DBP absorbing capacity (ml/100 g.) | Specific surface area (m²/g) |
| A | 700 | 125 | 20 |

TABLE 1-continued

| Carbon black | | Physical characteristic | |
|---|---|---|---|
| Kind | Particle diameter (Å) | DBP absorbing capacity (ml/100 g.) | Specific surface area (m²/g) |
| B | 220 | 130 | 110 |

Note: DBP absorbing capacity was measured by ASTM D2414-79

EXAMPLE 1

Catalyst 1

A mixture of 225 g. of boehmite powder (Pural SB manufactured by Condea Co.) (Al$_2$O$_3$ content: 75%) and 67.5 g. of carbon black A (30 wt.% based on boehmite) was mixed in a dry form by a mixer for 60 min. and the mixture was transferred to a batch type kneader (capacity: 2 liter) and was kneaded while adding 267 g. of a 4.3% nitric acid aqueous solution in about 5 min. and further kneaded for 25 min. After adding 128 g. of a 2.1% ammonia water, the mixture was further kneaded for 25 min. The mixture was then extruded in a diameter of 1.5 mm by a screw type extruding machine. The extruded product was dried at 120° C. for 3 hours and then, was gradually heated in an electric furnace in dry air flow and was finally fired at 600° C. for 3 hours to obtain an activated alumina carrier.

The carrier thereby obtained was immersed in an aqueous ammonium molybdate solution at room temperature for one night, and after removing water, it was dried at 120° C. for 3 hours, and further fired at 600° C. for 3 hours. Then, it was immersed in an aqueous cobalt nitrate solution at room temperature for one night, and after removing water, it was again dried and fired in the above mentioned manner to obtain Catalyst 1.

The physical properties and the amount of the catalytic component of Catalyst 1 are shown in Table 2.

EXAMPLE 2

Catalyst 2

An activated alumina carrier was prepared in the same manner as in the preparation of Catalyst 1 except that the ammonia water was not used, 200 g. of a 2.0% nitric acid aqueous solution was used instead of the 4.3% of nitric acid aqueous solution and the kneading time was 60 min. In the same manner, a catalytically active component was applied to the carrier to obtain Catalyst 2.

The physical properties and the amount of the catalytically active component of Catalyst 2 are shown in Table 2, and the pore distribution graph is shown in FIG. 1.

EXAMPLE 3

Catalyst 3

The preparation of an activated alumina carrier and the application of a catalytically active component on the carrier were carried out in the same manner as in the preparation of Catalyst 1 except that 225 g. of a 3.75% acetic acid aqueous solution was used instead of the nitric acid aqueous solution, and 112.5 g. of a 2.5% ammonia water was used instead of the 2.1% ammonia water, whereby Catalyst 3 was obtained.

The physical properties and the amount of the catalytically active component of Catalyst 3 are shown in Table 2.

EXAMPLE 4

Catalyst 4

250 g. of the same boehmite powder as used in the preparation of Catalyst 1, was fed to a kneader, and kneaded for 72 min. while adding 270 g. of an aqueous solution containing 7.5 g. of polyvinyl alcohol having an average molecular weight of 60,000. Then, 75 g. of carbon black A and 40 g. of water were added and the mixture was kneaded for 30 min. Thereafter, in a manner similar to the preparation of Catalyst 1, an activated alumina carrier was prepared, and a catalytically active component was applied onto the carrier to obtain Catalyst 4.

Figure 2:
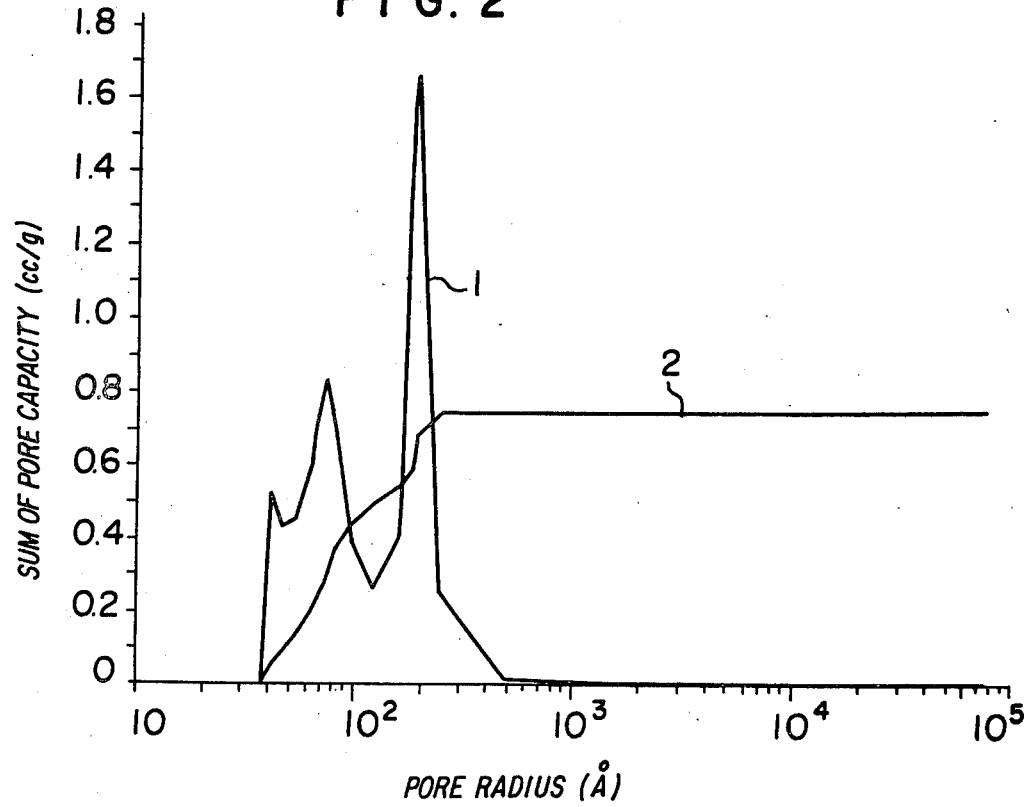

The physical properties and the amount of the catalytically active component of Catalyst 4 are shown in Table 2, and the pore distribution graph is shown in FIG. 2.

EXAMPLE 5

Catalyst 5

Catalyst 5 was prepared in the same manner as in the preparation of Catalyst 1 except that carbon black B was used instead of carbon black A.

EXAMPLE 6

Catalyst 6

A mixture of 200 g. of the same boehmite powder as used in the preparation of Catalyst 1, 100 g. of carbon black A and 24.3 g. of molybdenum trioxide was mixed in a dry form for 60 min. in a mixer, and then transferred to a kneader. 292 g. of a 4.3% nitric acid aqueous solution containing 26.7 g. of cobalt nitrate hexahydrate dissolved therein was added and the mixture was kneaded for 25 min. Then, 162 g. of a 2.1% ammonia water was added, and the mixture was kneaded for 30 min. Thereafter, in a manner similar to the preparation of Catalyst 1, the extrusion, drying and firing were carried out to obtain Catalyst 6.

The physical properties and the amount of the catalytically active component of Catalyst 6 are shown in Table 2, and the pore distribution graph is presented in FIG. 3.

EXAMPLE 7

Catalyst 7

A mixture of 225 g. of transition alumina ($\chi$-alumina) powder having an average particle size of $20\mu$ and 67.5 g. of carbon black A was mixed in a dry form in a mixer, and then transferred to a kneader. 131 g. of an aqueous solution containing 6.75 g. of polyethylene glycol having an average molecular weight of 200 was added, and the mixture was kneaded for 50 min. and extruded in the same manner as in the preparation of Catalyst 1. The extruded product was aged for 6 days at room temperature in an autoclave, and then subjected to steam curing in the presence of water at 130° C. for 2 hours. The rehydrated alumina thereby obtained was dried and fired at 700° C. for 3 hours to obtain an activated alumina carrier. A catalytically active component was applied onto this carrier in the same manner as in the preparation of Catalyst 1 to obtain Catalyst 7.

The physical properties and the amount of the catalytically active component of Catalyst 7 are shown in Table 2, and the pore distribution graph is presented in FIG. 4.

EXAMPLE 8

Catalyst 8

Catalyst 8 was prepared in the same manner as in the preparation of Catalyst 1 except that the amount of carbon black A was changed to 90.0 g.

The physical properties and the amount of the catalytically active component of Catalyst 8 are shown in Table 2, and the pore distribution graph is presented in FIG. 5.

EXAMPLE 9

Catalyst 9

Catalyst 9 was prepared in the same manner as in the preparation of Catalyst 1 except that an aqueous nickel nitrate solution was used instead of the aqueous cobalt nitrate solution.

The physical properties and the amount of the catalytically active component of the Catalyst 9 are shown in Table 2.

EXAMPLE 10

Catalyst 10

Catalyst 10 was prepared in the same manner as in the preparation of Catalyst 1 except that an aqueous solution of a mixture of cobalt nitrate and nickel nitrate was used instead of the aqueous cobalt nitrate solution.

The physical properties and the amount of the catalytically active component of the Catalyst 10 are shown in Table 2.

COMPARATIVE EXAMPLES 1 TO 5

Catalysts U, V, W, X and Y were prepared in the same manner as in the preparation of Catalysts 1, 2, 3, 4 and 6, respectively, except that no carbon black A was used.

The physical properties of the amounts of the catalytically active components of the respective Catalysts are shown in Table 2, and the pore distribution graphs of Catalysts U and X are presented in FIGS. 6 and 7, respectively.

COMPARATIVE EXAMPLE 6

A mixture of 250 g. of the same transition alumina as used in the preparation of Catalyst 7 and 12.5 g. of crystalline cellulose, was mixed for 60 min. in a dry form in a mixer, and then transferred to a kneader. 162.5 g. of water was added and the mixture was kneaded for 50 min. Thereafter, in the same manner as in the preparation of Catalyst 7, an activated alumina carrier was prepared, and a catalytically active component was applied to the carrier in the same manner as in the preparation of Catalyst 1, whereby Catalyst Z was obtained.

The physical properties and the amount of the catalytically active component of Catalyst Z are shown in Table 2.

TABLE 2

| | Catalysts | | Physical properties of Catalysts | | | | | | | | Amount of the catalytically active component[1] | | |
|---|---|---|---|---|---|---|---|---|---|---|---|---|---|
| | | | Strength (kg/ℓ) | Specific surface area (m²/g) | Peak pore radius (Å) | Pore capacities (cc/g) | | | | | $M_oO_3$ (wt. %) | $C_oO$ (wt. %) | NiO (wt. %) |
| | | | | | | 37.5–75000 Å | 37.5–100 Å | 100–500 Å | 500–1000 Å | 1000–75000 Å | | | |
| Examples | 1 | 1 | 2.3 | 221 | 71, 220 | 0.848 | 0.572 | 0.271 | 0.003 | 0.002 | 13.4 | 3.8 | — |
| | 2 | 2 | 3.7 | 212 | 42, 260 | 0.584 | 0.367 | 0.208 | 0.004 | 0.005 | " | " | — |
| | 3 | 3 | 2.2 | 231 | 68, 200 | 0.886 | 0.660 | 0.223 | 0.002 | 0.001 | " | " | — |
| | 4 | 4 | 2.1 | 223 | 76, 200 | 0.749 | 0.445 | 0.298 | 0.004 | 0.002 | " | " | — |
| | 5 | 5 | 1.9 | 238 | 65, 140 | 0.934 | 0.507 | 0.421 | 0.004 | 0.002 | " | " | — |
| | 6 | 6 | 2.3 | 255 | 55, 270 | 0.988 | 0.572 | 0.404 | 0.007 | 0.005 | " | " | — |
| | 7 | 7 | 3.2 | 171 | 53, 300 | 0.679 | 0.316 | 0.309 | 0.064 | 0.010 | " | " | — |
| | 8 | 8 | 2.0 | 209 | 76, 260 | 0.950 | 0.515 | 0.425 | 0.006 | 0.004 | " | " | — |
| | 9 | 9 | 2.1 | 209 | 76, 220 | 0.850 | 0.539 | 0.295 | 0.009 | 0.007 | " | — | 4.0 |
| | 10 | 10 | 2.0 | 216 | 75, 215 | 0.841 | 0.535 | 0.302 | 0.002 | 0.002 | " | 2.0 | 2.0 |
| Comparative Examples | 1 | U | 2.5 | 191 | 67 | 0.562 | 0.536 | 0.023 | 0.001 | 0.002 | " | " | — |
| | 2 | V | 4.5 | 249 | 43 | 0.297 | 0.290 | 0.003 | 0.002 | 0.002 | " | " | — |
| | 3 | W | 2.3 | 219 | 68 | 0.601 | 0.571 | 0.027 | 0.002 | 0.001 | " | " | — |
| | 4 | X | 2.6 | 184 | 89 | 0.669 | 0.621 | 0.040 | 0.006 | 0.002 | " | " | — |
| | 5 | Y | 4.3 | 221 | 46 | 0.347 | 0.345 | 0.001 | 0.000 | 0.001 | " | " | — |
| | 6 | Z | 1.3 | 239 | 48 | 0.467 | 0.212 | 0.152 | 0.042 | 0.061 | " | " | — |

[1]wt. % based on the total catalyst composition

APPLICATION EXAMPLE 1

6.0 g. of each of Catalysts 1 to 10 and U to Z, and 60 g. of Arabian light type atmospheric distillation residual oil (sulfur content: 3.03 wt.%, V: 31.0 ppm, Ni: 6.1 ppm) were fed into a swingable shaking type autoclave having a capacity of 200 ml, and the hydrogenation treatment for desulfurization and removal of heavy metals was carried out at 360° C. under 160 kg/cm²G for 3 hours. The removal rates of the sulfur content, V and Ni are shown in Table 3.

TABLE 3

| | Removal rates (%) | | |
|---|---|---|---|
| Catalysts | Sulfur contents | V | Ni |
| 1 | 70.0 | 86.4 | 63.5 |
| 2 | 66.4 | 77.3 | 52.4 |
| 3 | 71.0 | 88.9 | 62.3 |
| 4 | 69.0 | 92.8 | 77.0 |
| 5 | 70.6 | 91.7 | 75.4 |
| 6 | 68.3 | 90.8 | 67.2 |
| 7 | 64.7 | 84.8 | 60.7 |
| 8 | 69.1 | 92.0 | 75.4 |
| 9 | 69.7 | 88.1 | 64.4 |
| 10 | 71.0 | 89.7 | 63.9 |
| U | 67.3 | 73.1 | 50.8 |
| V | 62.3 | 50.0 | 44.3 |
| W | 70.3 | 72.6 | 50.8 |
| X | 68.6 | 79.4 | 52.4 |
| Y | 64.7 | 51.2 | 47.5 |
| Z | 63.0 | 67.2 | 47.5 |

APPLICATION EXAMPLE 2

The continuous hydrogenation treatment of Middle East atmospheric distillation residual oil (specific gravity (15/4° C.): 0.9569, sulfur content: 3.24 wt.%, V: 68.1 ppm, N: 19.3 ppm) was carried out by a small scale fixed bed high pressure reactor with use of Catalyst 8 and Catalyst X.

A mixture of 65 ml of the catalyst and 65 ml of carborundum was packed in a reaction tube having an inner diameter of 13 mm, and after preliminarily sulfiding the catalyst with a light oil haing a sulfur content of 2.2 wt.%, the residual oil was continuously supplied to the reactor at a liquid hourly space velocity of 0.65 hr⁻¹, at a ratio of hydrogen to oil being 850 Nm³/kl under 150 kg/cm²G while controlling the temperature of the catalytic bed to bring the desulfurization rate to 75.3% (i.e. to bring the sulfur content of the product oil to 0.80 wt.%).

The results thereby obtained are as shown in FIG. 8. It has been confirmed that the change with time of the desulfurization activity is almost equal in both cases of Catalyst 8 and Catalyst X, but Catalyst 8 is far superior in the metal removal activity.

In FIG. 8, the horizontal axis represents the duration of the supply of the oil, and the vertical axis represents the metal contents (V and Ni) of the product oil, at the lower portion and the reaction temperature required to maintain the sulfur content of the product oil to be 0.80 wt.%, at the upper portion.

We claim:

1. A hydrogenation catalyst for desulfurization and removal of heavy metals, which comprises: (a) at least one metal component selected from the group consisting of metals of Groups VI B and VIII of the Periodic Table, as a catalytically active component, and (2) a porous activated alumina carrier obtained by shaping a mixture of carbon black and a powder of activated alumina or a precursor of activated alumina, drying the shaped mixture and firing said dried mixture in an oxygen-containing gas stream to burn off the carbon black.

2. The hydrogenation catalyst for desulfurization and removal of heavy metals according to claim 1 wherein the catalyst has a specific surface area within a range of from 100 to 350 m²/g; the total pore capacity of pores having a radius within a range of from 37.5 to 75,000 Å is within a range of from 0.5 to 1.5 cc/g; at least 90% of the total pore capacity is constituted by pores having a radius within a range of from 37.5 to 1000 Å; the pore distribution is such that there is a distinct peak in each of radius range of less than 100 Å and a radius range of from 100 to 1000 Å; the pore capacity of pores having a radius within a range of from 37.5 to 100 Å is at least 0.2 cc/g; and the pore capacity of pores having a radius within a range of from 100 to 1000 Å is at least 0.1 cc/g.

3. The hydrogenation catalyst for desulfurization and removal of heavy metals according to claim 1 wherein the catalyst has a specific surface area within a range of from 100 to 350 m²/g; the total pore catacity of pores having a radius within a range of from 37.5 to 75,000 Å is within a range of from 0.5 to 1.5 cc/g; at least 90% of the total pore capacity is constituted by pores having a radius within a range of from 37.5 to 500 Å; the pore distribution is such that there is a distinct peak in each of a radius range of from 50 to 100 Å and a radius range of from 100 to 500 Å; the pore capacity of pores having a radius within a range of from 37.5 to 100 Å is at least 0.4 cc/g; and the pore capacity of pores having a radius within a range of from 100 to 500 Å is at least 0.1 cc/g.

4. The hydrogenation catalyst for desulfurization and removal of heavy metals according to claim 1 wherein the catalyst has a specific surface area within a range of from 200 to 300 m$^2$/g; the total pore capacity of pores having a radius within a range of from 37.5 to 75,000 Å is within a range of from 0.7 to 1.2 cc/g; at least 90% of the total pore capacity is constituted by pores having a radius within a range of from 37.5 to 500 Å; the pore distribution is such that there is a distinct peak in each of a radius range of from 50 to 100 Å and a radius range of from 100 to 500 Å; the pore capacity of pores having a radius within a range of from 37.5 to 100 Å is within a range of from 0.4 to 0.8 cc/g; and the pore capacity of pores having a radius within a range of from 100 to 500 Å is within a range of from 0.2 to 0.5 cc/g.

5. The hydrogenation catalyst for desulfurization and removal of heavy metals according to claim 1, 2, 3 or 4, wherein the catalytically active component comprises at least one metal selected from the group consisting of molybdenum and tungsten and at least one metal selected from the group consisting of cobalt and nickel.

6. The hydrogenation catalyst for desulfurization and removal of heavy metals according to claim 1, 2, 3 or 4 wherein the catalytically active component comprises molybdenum and cobalt.

7. A process for producing a hydrogenation catalyst for desulfurization and removal of heavy metals, which comprises: shaping a mixture of carbon black and a powder of activated alumina or a precursor of activated alumina, said mixture optionally containing a catalytically active component selected from the group consisting of metals of Groups VI B and VIII of the Periodic Table; drying the shaped mixture; and firing said dried mixture in an oxygen-containing gas stream to burn off the carbon black; and, when said mixture does not contain the catalytically active component, applying the catalytically active component onto the porous activated alumina carrier thereby obtained.

8. A process for producing a hydrogenation catalyst for desulfurization and removal of heavy metals, which comprises: shaping a mixture of carbon black and a powder of activated alumina or a precursor of activated alumina; drying the shaped mixture; firing said dried mixture in an oxygen-containing gas stream to burn off the carbon black; and applying a catalytically active component selected from the group consisting of metals of Groups VI B and VIII of the Periodic Table onto the porous activated alumina carrier thereby obtained.

9. A process for producing a hydrogenation catalyst for desulfurization and removal of heavy metals, which comprises: shaping a mixture of carbon black, activated alumina or a precursor of activated alumina, and, as a catalytically active component, a single substance or a compound of at least one metal selected from the group consisting of metals of Groups VI B and VIII of the Periodic Table; drying the shaped mixture; and firing said dried mixture in an oxygen-containing gas stream to burn off the carbon black.

10. The process for producing the hydrogenation catalyst for desulfurization and removal of heavy metals according to claim 7, 8 or 9 wherein the catalytically active component comprises at least one metal selected from the group consisting of molybdenum and tungsten and at least one metal selected from the group consisting of cobalt and nickel.

11. The process for producing the hydrogenation catalyst for desulfurization and removal of heavy metals according to claim 7, 8 or 9 wherein the catalytically active component comprises molybdenum and cobalt.

12. The process for producing the hydrogenation catalyst for desulfurization and removal of heavy metals according to claim 7, 8 or 9 wherein the catalytically active component comprises from 5 to 25% by weight of a metal of Group VI B of the Periodic Table and from 0.5 to 10% by weight of a metal of Group VIII, as calculated as the respective oxides in the total composition of the catalyst.

13. The process for producing the hydrogenation catalyst for desulfurization and removal of heavy metals according to claim 7, 8, 9, 10, 11, or 12 wherein the activated alumina or the precursor is activated alumina is $\gamma$-, $\eta$- or $\theta$-alumina or alumina hydrate as boehmite, pseudoboehmite or gibbsite or a rehydratable transition alumina.

14. The process for producing the hydrogenation catalyst for desulfurization and removal of heavy metals according to claim 7, 8, 9, 10, 11, 12 or 13 wherein carbon black having an average diameter ranging from 150 to 3000 Å is incorporated in said mixture of carbon black and alumina or alumina precursor at a content of 10 to 120 wt.% based on said alumina.

15. The process for producing the hydrogenation catalyst for desulfurization and removal of heavy metals according to claim 7, 8, 9, 10, 11, 12 or 13 wherein carbon black having an average diameter ranging from 150 to 3000 Å is incorporated in said mixture of carbon black and alumina or alumina precursor at a content of 20 to 100 wt.% based on said alumina.

16. The process for producing the hydrogenation catalyst for desulfurization and removal of heavy metals according to claim 7, 8, 9, 10, 11, 12, 13, 14 or 15 wherein the firing in the oxygen-containing gas stream to burn off the carbon black is conducted at a temperature of from 500° to 1000° C.

17. The process for producing the hydrogenation catalyst for desulfurization and removal of heavy metals according to claim 13, wherein said rehydratable transition alumina is $\chi$-alumina or $\rho$-alumina.

* * * * *